United States Patent
Lauffer et al.

(10) Patent No.: US 7,355,844 B2
(45) Date of Patent: Apr. 8, 2008

(54) SYSTEM AND METHOD FOR MANAGING INFORMATION HANDLING SYSTEM ADJUSTABLE CABLES

(75) Inventors: Scott Lauffer, Austin, TX (US); Kit R. Morris, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/431,038

(22) Filed: May 9, 2006

(65) Prior Publication Data
US 2006/0203441 A1    Sep. 14, 2006

Related U.S. Application Data

(63) Continuation of application No. 10/809,055, filed on Mar. 25, 2004, now Pat. No. 7,088,577.

(51) Int. Cl.
*H05K 5/00* (2006.01)
*F16L 3/22* (2006.01)

(52) U.S. Cl. .................. 361/683; 248/68.1; 174/79

(58) Field of Classification Search .......... 361/681, 361/683; 174/75 F, 79–80, 58, 63, 65 R, 174/135; 248/68.1; 348/843
See application file for complete search history.

(56) References Cited

U.S. PATENT DOCUMENTS

| 6,392,873 B1 * | 5/2002 | Honda ................... 361/681 |
| 6,816,364 B2 * | 11/2004 | Helot et al. ............. 361/681 |
| 6,822,857 B2 * | 11/2004 | Jung et al. .............. 361/681 |

\* cited by examiner

*Primary Examiner*—Jayprakash N Gandhi
*Assistant Examiner*—Zachary M Pape
(74) *Attorney, Agent, or Firm*—Hamilton & Terrile, LLP; Robert W. Holland

(57) ABSTRACT

Information handling system peripheral cables are managed with a cable clip guide that couples to and extends from the peripheral stand. The cable clip guide includes a support arm that extends substantially perpendicular from the support stand to maintain a ring in a substantially parallel alignment with the support stand. The ring inner circumference guides the cables from the support in a desired direction and is sized to allow movement of the cable through the ring in response to movement of the peripheral, such as the raising, lowering or rotating of a flat panel display. An opening formed from the inner to the outer circumference is sized to retain cables within the ring, however, flexing of the ring increases the opening to allow passage of cables into and out of the ring.

11 Claims, 3 Drawing Sheets

SYSTEM AND METHOD FOR MANAGING INFORMATION HANDLING SYSTEM ADJUSTABLE CABLES

This application is a continuation of application No. 10/809,055, filed Mar. 25, 2004, now U.S. Pat. 7,088,577, entitled "System and Method for Managing Information Handling System Adjustable Cables" and naming Scott Lauffer and Kit R. Morris as inventors, which is hereby incorporated by reference in its entirety.

BACKGROUND OF THE INVENTION

1. Field of the Invention

The present invention relates in general to the field of information handling system cable management, and more particularly to a system and method for managing information handling system adjustable cables.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with each other and one or more external peripherals to display, print, communicate or otherwise process information. For instance, displays, speakers, printers, scanner and network cables typically extend from an information handling system to each respective peripheral to communicate information and in some cases power from the information handling system to each peripheral. Often, peripherals and their cables are positioned during set up of the information handling systems to remain in relatively permanent relation to each other, generally by fixing the cables in position with clamps. In large part, the relatively fixed position of peripherals and cables has resulted from the bulkiness and weight of information handling systems and peripherals, which has restricted the practicality of rearrangement of a set-up system. As an example, conventional cathode ray tube (CRT) displays generally have such large footprints and weights that movement of a CRT display in a desktop environment is not practical. This has become increasingly true as consumers have moved towards larger CRT displays having greater display space.

Recently, as the power of information handling system components has increased and their sized decreased, information handling system manufacturers have strived to reduce the size of installed systems and thus improve consumer flexibility in arranging a system. One innovation that has helped to reduce the footprint of installed information handling systems is the use of flat panel displays instead of CRT displays. Flat panel displays use liquid crystal display (LCD) or plasma pixels to display information instead of phosphors pixels used by CRT displays and thus do not require an electron gun to illuminate the pixels. As a result, flat panel displays have considerably reduced depth and weight when compared with CRT displays. The reduced bulkiness and weight of flat panel displays allows information handling system users to more easily adjust the position of a display on a desktop. In addition, flat panel displays are often mounted on a stand that allows rotation of the display, both vertically and horizontally, and adjustment of the height of the display area relative to the desktop. Thus, for instance, a user may rotate a panel by ninety degrees to present pages with enhanced size using the lengthiest portion of the display. However, one difficulty that often arises with movement of a flat panel display is that the cables running from the information handling system to the flat panel display tend to bind or bunch to either restrict movement of the display or require a user to move the display with two hands.

SUMMARY OF THE INVENTION

Therefore a need has arisen for a system and method which manages an information handling system peripheral's cables to support convenient movement of the information handling system peripheral, such as movement of a flat panel display in a desktop environment.

In accordance with the present invention, a system and method are provided which substantially reduce the disadvantages and problems associated with previous methods and systems for information handling system peripheral cable management. A ring disposed proximate to a stand that supports a peripheral aligns to guide cables between the peripheral and an information handling system. The inner circumference of the ring is sized to allow movement of the cable without substantial restriction so that forces applied to the cable by movement of the peripheral move the cable without binding or bunching.

More specifically, a flat panel display couples to an adjustable support that allows a user to move the flat panel display to a selectable view position, such as adjustable height, adjustable viewing angle or a portrait/landscape view. A cable clip guide couples to the stand to direct in a desired direction the cables running between the flat panel display and an information handling system, such as video, audio and power cables. The cable clip guide has a support arm that couples with the flat panel display at one end and a ring at the opposite end to provide room for the cables to proceed from the support to the ring. The ring has an inner circumference sized to allow movement of the cables through the ring in response to movement of the cables resulting from movement of the flat panel display. A cable access opening between the ring inner and outer circumferences is sized to prevent passage of cables but increases in size with flexing of the ring to allow passage of the cables for inserting or removing cables. For instance, the ring is formed from injection molded plastic that flexes to form an opening of greater size when under pressure and returns to the original size when pressure is released.

The present invention provides a number of important technical advantages. One example of an important technical advantage is that an information handling system peripheral may be conveniently moved about in a desktop environment. For instance, movement of a flat panel display is supported with reduced resistance or binding of cables that interface the flat panel display with an information handling system. In particular, cables are conveniently managed for rotation or height adjustment of a flat panel display on a support stand with the need for separate user manipulation of cables during or after movement of the flat panel display substantially reduced or eliminated. Single-handed insertion of cables in the cable clip and single handed adjustment of a flat panel display aid system set up in small spaces where, for instance, a user may only be able to reach cables at the rear of a flat panel display with one hand.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A cable clip guide coupled to an information handling system peripheral stand manages cables between the information handling system and peripheral to reduce binding or bunching of the cables in the event of movement of the peripheral. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
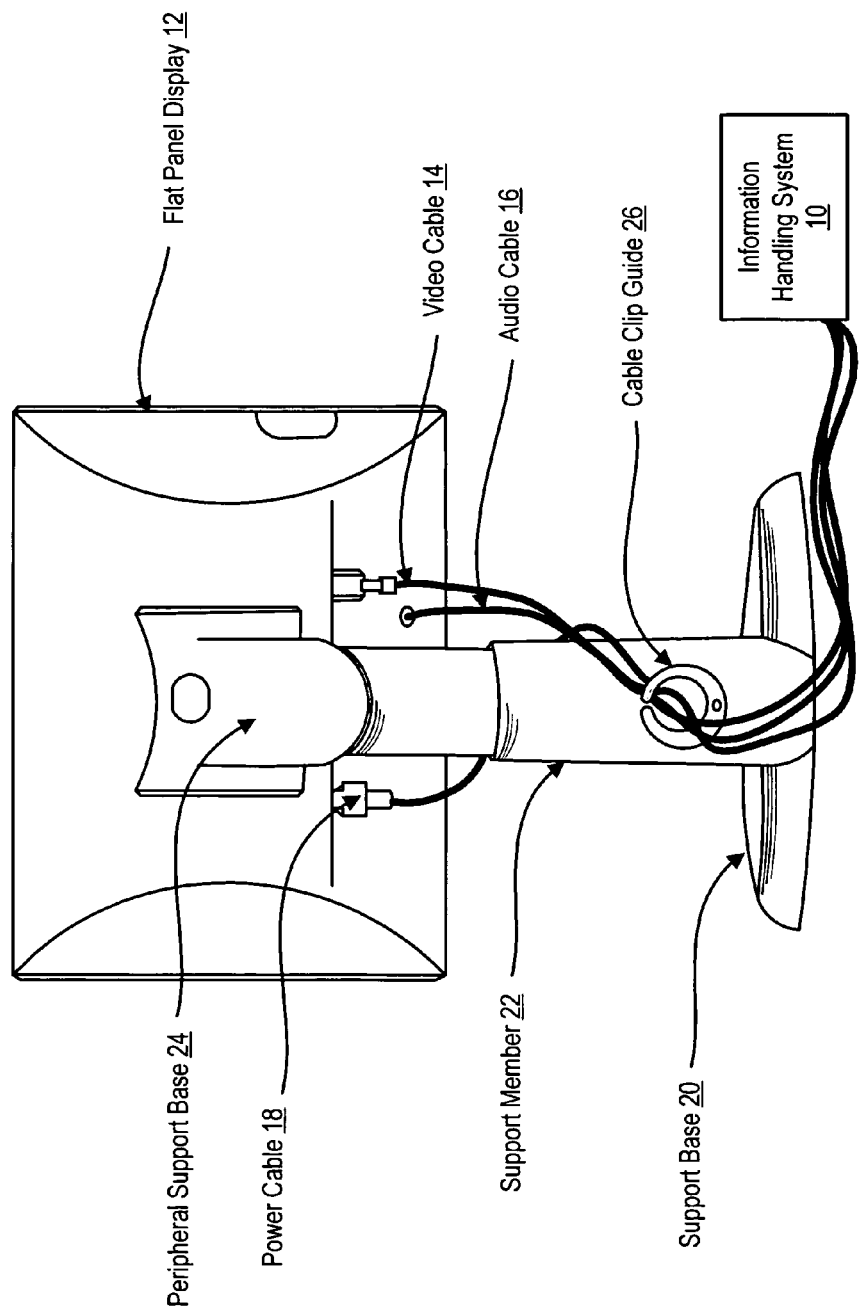
FIG. 1 depicts a rear view of an information handling system flat panel display and stand configured with a cable clip guide.

Referring now to FIG. 1, an information handling system peripheral cable management system is depicted configured to manage cables between an information handling system 10 and a flat panel display 12. Information handling system 10 includes processing components, such as a CPU, video card and audio card, which generate information for presentation at flat panel display 12. Video information is communicated from information handling system 10 to flat panel display 12 through a video cable 14 for presentation at a display screen. Audio information is communicated from information handling system 10 to flat panel display 12 through an audio cable 16 for presentation at integrated speakers. A power cable 18 provides power from information handling system 10 to power flat panel display 12.

Flat panel display 12 is supported in a viewing position by a support stand that is separate from information handling system 10. A support stand base 20 rests on a flat surface, such as a desktop, to provide a stable platform. An adjustable support member 22 couples to support base 20 at a bottom end and couples to an adjustable peripheral support base 24 at a top end. Peripheral support base 24 couples to flat panel display 12 to hold flat panel display 12 in a viewing position selected by a user. Support member 22 and peripheral support base 24 cooperate to adjust along a vertical axis to raise and lower flat panel display 12, to rotate about the vertical axis to change the viewing angle relative to support stand base 20, and to rotate about a horizontal axis to change the view between a landscape and portrait view.

Movement of flat panel display 12, either by adjustment relative to a fixed position of support stand 20 or by movement of the entire stand, introduces forces to the cables that interface flat panel display 12 to information handling system 10, such as video cable 14, audio cable 16 and power cable 18. A cable clip guide 26 manages the forces applied to the cables by movement of flat panel display 12 in order to prevent binding or bunching of the cables. Cable clip guide 26 couples to support member 22 near the bottom end to guide the cables without restricting motion of the cables through a guide area. Cable clip guide 26 extends perpendicularly from support member 22 to provide room for the cables and maintains the guide area in substantially parallel alignment with support member 22 to direct the cables outward from the support stand.

Figure 2:
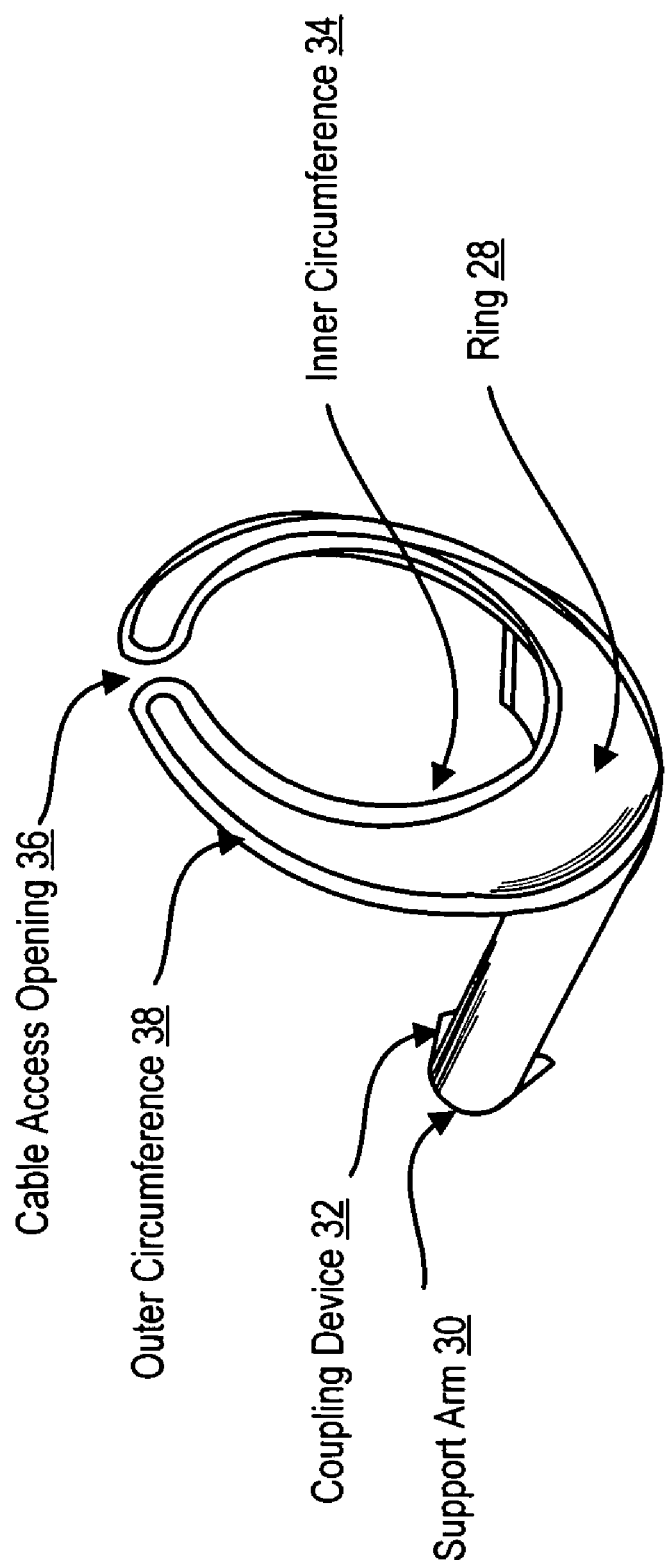
FIG. 2 depicts a close-up view of the cable clip guide.

Referring now to FIG. 2, an upper perspective view of cable clip guide 26 depicts a close-up view of the guide area that manages cable motion. Cable clip guide 26 has a ring 28 that guides the cables, a support arm 30 that supports ring 28 in a guide position, and a coupling device 32 that couples support arm 30 to a flat panel display support stand. Ring 28 has an inner circumference 34 that is sized to retain cables without restricting the lateral movement of the cables within ring 28. A cable access opening 36 is formed between inner circumference 34 and an outer circumference 38 to manage entry and exit of cables from ring 28. Cable access opening 36 is sized smaller than any individual cable in order to restrict passage of cables between the inner and outer circumferences, however, ring 28 is fabricated from a flexible material so that flexing of ring 28 increases the size of cable access opening 36 to selectively allow passage of cables. For instance, ring 28, support arm 30 and coupling device 32 are formed from a single piece of injection molded plastic having resilience adapted to allow flexing for adjusting the size of cable access opening 36. Coupling device 32 is depicted as a clip that flexes to engage an opening in a support stand. Coupling device 32 couples support arm 30 in a fixed position or, alternatively, allows some degree of rotation of support arm 30 to adjust the position of ring 28 rotationally in response to cable forces.

Figure 3:
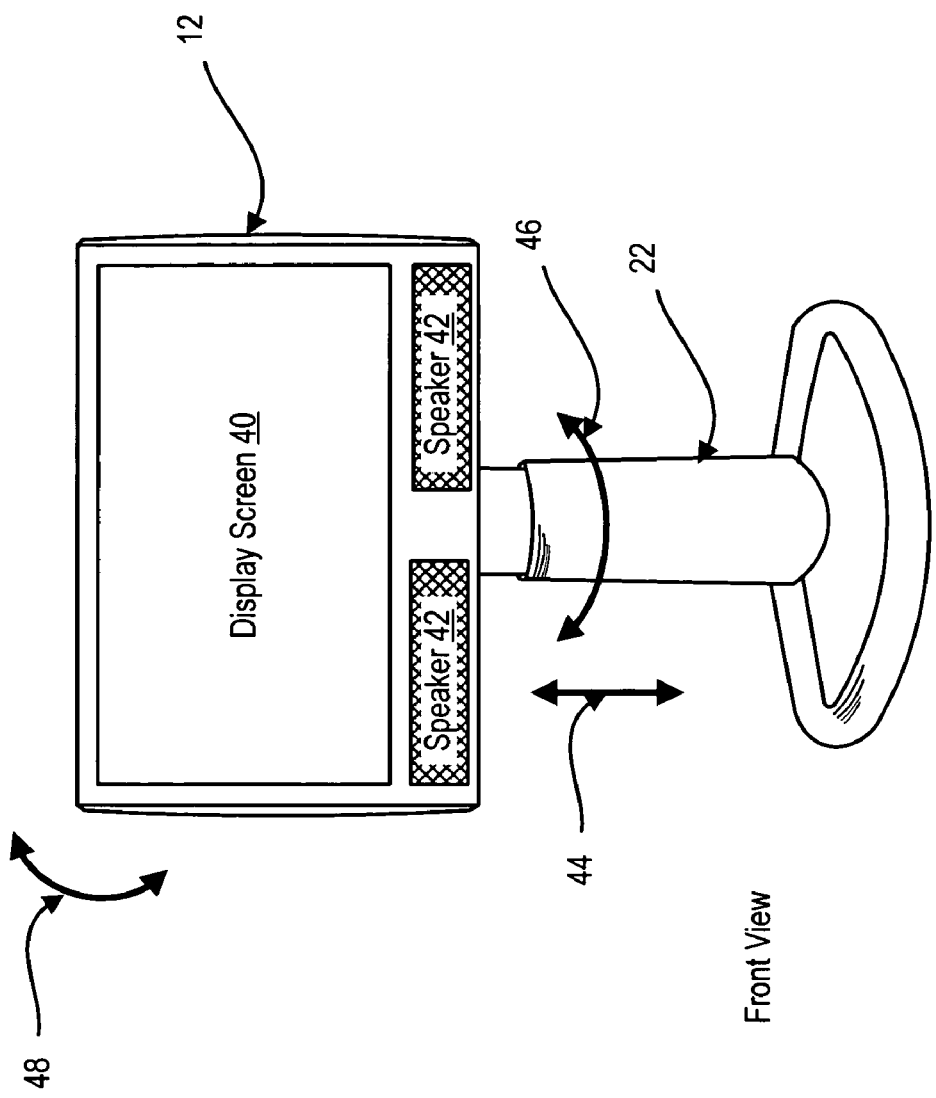
FIG. 3 depicts a front view of a flat panel display having selectable user views adjustable in three axes.

Referring now to FIG. 3, a front view of flat panel display 12 depicts a display screen area 40 for presenting video information and speakers 42 for presenting audio information. Flat panel display 12 adjusts along several axes to offer a user a selected of adjustable viewing positions of display screen 40. Adjustment along each axis introduces force to the cables that interface flat panel display 12 with an information handling system with the force managed by cable clip guide 26. Adjustment along a vertical axis by adjusting the height of support member 22, as depicted by arrow 44, raises and lowers the height of flat panel display 12 relative to support stand base 20. Support member 22 adjusts vertically by telescoping a movable upper portion from a fixed lower portion. In the depicted embodiment, cable clip guide 26 couples to the fixed lower portion of support member 22 although, in alternative embodiments, cable clip guide 26 may couple to movable portions of the stand. Rotation about the vertical axis as depicted by arrow 46 changes the angle of view presented to a user relative to support stand base 20. Rotation about a horizontal axis, as depicted by arrow 48, changes the orientation of information depicted by display screen 40 between a landscape view and a portrait view.

Although the present invention has been described in detail, it should be understood that various changes, substitutions and alterations can be made hereto without departing from the spirit and scope of the invention as defined by the appended claims.

What is claimed is:

1. An information handling system comprising:
a flat panel display operable to present visual information generated by processing components;
a stand operable to mount the flat panel display in a vertically raised position and to support movement the flat panel display in variable positions;
one or more cables interfacing the processing components to the flat panel display; and
a cable clip extending outward from the stand, the cable clip having a guide forming an opening in a plane and having a support arm having a first end connecting the guide to the stand and a second end terminating with the guide held in space free from and distal to the stand and flat panel display, the opening sized to accept the one or more cables and the plane of the opening aligned substantially perpendicular to the support arm to constrain the cables within the cable clip during movement of the flat panel display between the variable positions.

2. The information handling system of claim 1 wherein the cable clip further comprises an injection molded plastic ring forming the guide, the ring having an opening for inserting cables into the guide.

3. The information handling system of claim 2 wherein the opening is sized to restrict passage of the cables and the ring is operable to flex to permit passage of the cables.

4. The information handling system of claim 3 further comprising speakers integrated with the flat panel display, wherein the one or more cables comprise a video cable for communicating video information from the information handling system to the flat panel display and an audio cable for communicating audio information to the integrated speakers.

5. The information handling system of claim 1 wherein the one or more cables comprise a power cable operable to supply power from the information handling system to the flat panel display.

6. The information handling system of claim 1 wherein the variable positions of the stand comprise varying heights of the flat panel display.

7. The information handling system of claim 1 wherein the variable positions of the stand comprise varying rotational orientations of the flat panel display along a vertical axis.

8. The information handling system of claim 1 wherein the variable positions of the stand comprise varying rotational orientations of the flat panel display between landscape and portrait display configurations.

9. An information handling system peripheral cable management system comprising:
a support base operable to rest on a surface;
a peripheral base operable to couple to a peripheral;
a support member coupled between the support base and the peripheral base, the support member disposing the peripheral base vertically over the support base, the peripheral base vertically positioned to couple to a peripheral;
a cable clip having a support arm and a guide, the support arm having a first end connecting to the support member and a second end extending outward from the support member and terminating with the guide supported distal the support member and peripheral base, the guide having an opening in a plane, the plane aligned substantially parallel with the support member and substantially perpendicular to the support arm to accept cables from the peripheral and maintain the cables in an accessible position; and
a flat panel display coupled to the peripheral base, the flat panel display having plural cables routed through the cable clip guide;
wherein the plural cables comprise a power cable and a video cable, and wherein the cable clip guide comprises a ring having an inner circumference sized to allow free movement of the cables;
wherein the ring has an opening formed between the inner circumference and an outer circumference, the opening sized to restrict passage of cables, the ring operable to flex to increase the opening size to allow insertion of cables from the outer to the inner circumference and removal of cables from the inner to the outer circumference.

10. An information handling system peripheral cable management system comprising:
a support base operable to rest on a surface;
a peripheral base operable to couple to a peripheral;
a support member coupled between the support base and the peripheral base, the support member disposing the peripheral base vertically over the support base, the peripheral base vertically positioned to couple to a peripheral;
a cable clip having a support arm and a guide, the support arm having a first end connecting to the support member and a second end extending outward from the support member and terminating with the guide supported distal the support member and peripheral base, the guide having an opening in a plane, the plane aligned substantially parallel with the support member and substantially perpendicular to the support arm to accept cables from the peripheral and maintain the cables in an accessible position; and
a flat panel display coupled to the peripheral base, the flat panel display having plural cables routed through the cable clip guide;
wherein the plural cables comprise a power cable and a video cable, and wherein the cable clip guide comprises a ring having an inner circumference sized to allow free movement of the cables;
wherein the support member is operable to adjust the rotational position of the flat panel display around a vertical axis, the cables moving freely within the ring during movement of the flat panel display.

11. An information handling system peripheral cable management system comprising:
a support base operable to rest on a surface;
a peripheral base operable to couple to a peripheral;

a support member coupled between the support base and the peripheral base, the support member disposing the peripheral base vertically over the support base, the peripheral base vertically positioned to couple to a peripheral;

a cable clip having a support arm and a guide, the support arm having a first end connecting to the support member and a second end extending outward from the support member and terminating with the guide supported distal the support member and peripheral base, the guide having an opening in a plane, the plane aligned substantially parallel with the support member and substantially perpendicular to the support arm to accept cables from the peripheral and maintain the cables in an accessible position; and a flat panel display coupled to the peripheral base, the flat panel display having plural cables routed through the cable clip guide;

wherein the plural cables comprise a power cable and a video cable, and wherein the cable clip guide comprises a ring having an inner circumference sized to allow free movement of the cables;

wherein the peripheral base is operable to adjust a rotational position of the flat panel display between vertical and horizontal orientations, the cables moving freely within the ring during movement of the flat panel display.

* * * * *